US008871097B2

(12) United States Patent
Zhang et al.

(10) Patent No.: US 8,871,097 B2
(45) Date of Patent: Oct. 28, 2014

(54) RECLAMATION OF FORMATE BRINES

(75) Inventors: Hui Zhang, Sugar Land, TX (US);
Robert L. Horton, Sugar Land, TX (US); Charles Svoboda, Katy, TX (US);
Frank E. Evans, The Woodlands, TX (US)

(73) Assignee: M-I L.L.C., Houston, TX (US)

( * ) Notice: Subject to any disclaimer, the term of this patent is extended or adjusted under 35 U.S.C. 154(b) by 843 days.

(21) Appl. No.: 12/671,711

(22) PCT Filed: Jul. 24, 2008

(86) PCT No.: PCT/US2008/071053
§ 371 (c)(1),
(2), (4) Date: Jun. 15, 2011

(87) PCT Pub. No.: WO2009/018099
PCT Pub. Date: Feb. 5, 2009

(65) Prior Publication Data
US 2011/0247986 A1 Oct. 13, 2011

Related U.S. Application Data

(60) Provisional application No. 60/953,624, filed on Aug. 2, 2007.

(51) Int. Cl.
*B01D 21/00* (2006.01)
*C02F 1/52* (2006.01)
*B01D 21/01* (2006.01)
*B03D 3/00* (2006.01)
*C02F 1/76* (2006.01)
*C02F 1/72* (2006.01)
*C09K 8/02* (2006.01)
*E21B 21/00* (2006.01)
*E21B 21/06* (2006.01)
*C02F 1/68* (2006.01)
*B01D 37/00* (2006.01)
*B01D 61/00* (2006.01)
*C02F 1/00* (2006.01)
*C09K 8/68* (2006.01)
*C02F 103/08* (2006.01)
*C02F 9/00* (2006.01)

(52) U.S. Cl.
CPC ............ *C02F 1/722* (2013.01); *C02D 2101/34* (2013.01); *C02F 2103/08* (2013.01); *E21B 21/068* (2013.01); *C02F 9/00* (2013.01); *C02F 1/766* (2013.01); *C02F 1/76* (2013.01)
USPC ..... 210/721; 210/724; 210/747.4; 210/747.8; 210/749; 210/753; 210/754; 210/758; 210/759; 210/767; 175/66; 175/206; 175/207; 507/203

(58) Field of Classification Search
None
See application file for complete search history.

(56) References Cited

U.S. PATENT DOCUMENTS

| 6,494,263 | B2 | 12/2002 | Todd |
|---|---|---|---|
| 6,730,234 | B2 * | 5/2004 | Symens et al. ................ 210/753 |
| 6,737,385 | B2 | 5/2004 | Todd et al. |
| 6,818,594 | B1 * | 11/2004 | Freeman et al. ............. 507/101 |
| 2007/0102359 | A1 * | 5/2007 | Lombardi et al. ............ 210/639 |
| 2007/0138101 | A1 * | 6/2007 | Javora et al. ................. 210/666 |

FOREIGN PATENT DOCUMENTS

| CA | 2161024 A1 | 10/1994 |
|---|---|---|
| WO | WO9424224 A1 * | 10/1994 |
| WO | 9524452 A1 | 9/1995 |
| WO | 0206422 A2 | 1/2002 |
| WO | 2004092534 A1 | 10/2004 |
| WO | 2007082207 A1 | 7/2007 |

OTHER PUBLICATIONS

International Search Report from PCT/US2008/071053 dated Oct. 29, 2008 (2 pages).
Written Opinion from PCT/US2008/071053 dated Oct. 29, 2008 (4 pages).
Office Action issued in corresponding European Application No. 08796569.5 dated Aug. 16, 2012 (5 pages).
Office Action issued in corresponding Mexican Application No. MX/a/2010/001162 dated Oct. 24, 2011 (6 pages).
Office Action issued in the corresponding Eurasian Application No. 201070222/(OFE/1003/0012) dated Feb. 29, 2012 (4 pages).
Office Action issued in corresponding Canadian Application No. 2,694,655 dated Apr. 5, 2012 (3 pages).
Office Action issued in corresponding Mexican Application No. MX/a/2010/001162 dated Apr. 13, 2011 (6 pages).
Office Action issued in corresponding Eurasian Application No. 201070222/(OFE/1003/0012) dated May 31, 2011 (4 pages).
Office Action issued in corresponding Canadian Application No. 2,694,655 dated Jun. 6, 2011 (4 pages).
Extended European Search Report issued in corresponding European Application No. 08796569.5 dated Jul. 26, 2011 (6 pages).

(Continued)

Primary Examiner — Nam Nguyen
Assistant Examiner — Clare Perrin
(74) Attorney, Agent, or Firm — Osha Liang LLP

(57) ABSTRACT

A method of reclaiming a formate brine may include increasing the pH of a spent formate brine fluid comprising water-soluble polymers; treating the fluid with an oxidizing agent; and removing at least a portion of suspended solids from the fluid. Further, a method of reclaiming a formate brine may include lowering the pH of the spent formate brine fluid comprising water-soluble polymers; increasing the pH of the spent formate brine fluid to initiate precipitation of materials solubilized in the fluid; treating the fluid with an oxidizing agent to break down remaining water-soluble polymer; and recovering at least a portion of the formate brine.

21 Claims, No Drawings

(56) References Cited

OTHER PUBLICATIONS

Office Action issued in Australian Application No. 2008282473 dated Aug. 18, 2010 (2 pages).

Office Action issued in corresponding Australian Application No. 2008282473 dated Aug. 18, 2011 (3 pages).

Office Action issued in corresponding Canadian Application No. 2,694,655 dated Dec. 12, 2012 (3 pages).

Office Action issued in corresponding Eurasian Application No. 201070222 (OFE/1003/0012) dated Oct. 16, 2012 (4 pages).

Office Action issued in corresponding European Application No. 08796569.5 dated Apr. 8, 2013 (5 pages).

Office Action issued in corresponding European Patent Application No. 08796569.5; Dated Dec. 11, 2013 (4 pages).

Official Action issued in corresponding Eurasian Application No. 201070222128; Dated Aug. 30, 2013 (4 pages).

Examination Report issued in corresponding Eurasian Application No. 201070222; Dated Apr. 1, 2014 (4 pages).

* cited by examiner

RECLAMATION OF FORMATE BRINES

BACKGROUND OF INVENTION

1. Field of the Invention

Embodiments disclosed herein relate generally to wellbore fluids. More specifically, embodiments of the present disclosure relate to the recovery of drilling and completion fluids.

2. Background Art

When drilling or completing wells in earth formations, various fluids typically are used in the well for a variety of reasons. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, fluid used for emplacing a packer, abandoning the well or preparing the well for abandonment, and otherwise treating the well or the formation.

Drilling fluids or muds typically include a base fluid (water, diesel or mineral oil, or a synthetic compound), weighting agents (most frequently barium sulfate or barite is used), bentonite clay to help remove cuttings from the well and to form a filter cake on the walls of the hole, lignosulfonates and lignites to keep the mud in a fluid state, and various other additives that serve specific functions.

Historically, the drilling industry has used water-based muds (WBMs) because they are inexpensive. The used mud and cuttings from wells drilled with WBMs can be readily disposed of onsite at most onshore locations. WBMs and cuttings can also be discharged from platforms in many U.S. offshore waters, as long as they meet current effluent limitations guidelines, discharge standards, and other permit limits.

Brines (such as, for example, aqueous $CaBr_2$) are commonly used in WBMs because of their wide density range and the fact that brines are typically substantially free of suspended solids. Brines enhance the performance of WBMs by preventing the hydration and migration of swelling clay to reduce formation damage caused by solids or clay swelling or migration. A brine system may be selected to achieve a suitable density for use in a particular well-drilling operation. One advantage of using brines is that for a formation that is found to interact adversely with one type of brine, there is often another type of brine available with which that formation will not interact adversely. Typically, brines are selected from halide salts of mono- or divalent cations, such as sodium, potassium, calcium, and zinc. Chloride-based brines of this type have been used in the petroleum industry for over 50 years, and bromide-based brines for at least 25 years. Formate-based brines, however, have only been widely used in the industry relatively recently (roughly the past ten years).

Cesium formate, which is a particular formate that has been more recently used in drilling and completion fluids, may be used as a solids-free base fluid. Cesium formate is the heaviest of the clear alkali formate fluids, having a specific gravity of 2.3 (density of 19.2 pounds per gallon). Because of this intrinsic high density, the necessity of weighting agents, such as barium sulfate, which can damage tools and the formation, can be eliminated. Other alkali formates, which are of lower density than cesium formate, and that are typically used in drilling and completion fluids include potassium formate, which has a specific gravity of 1.6 (density of 13.1 ppg), and sodium formate. Lower density formates are often be blended with cesium formate to produce a fluid having a specific gravity between 1.0 and 2.3.

Fluids containing cesium and/or potassium formate have been shown to increase production and improve drilling speeds, which can save time and reduce operating costs. Cesium and potassium formate have also been shown to be compatible with all major elements of the drilling (BOP, surface equipment, MWD, LWD and mud motors) and completion equipment (metals and elastomers), under conditions of high temperature and pressure. The monovalent nature of cesium and potassium formate reduces the likelihood of reservoir formation damage, providing operators with good control and desirable lubricity downhole. Furthermore, alkali formates do not damage the producing formation or downhole metals as their corrosive alternatives (high-density brines) may do. Because it is biodegradable as well as non-corrosive, cesium and/or potassium formate is considered an environmentally safer product than other drilling fluids on the market.

However, despite the desirable performance that results from a well drilled with cesium and/or potassium formate, there are effective limitations on its use. A fluid that includes cesium and/or potassium formate is relatively expensive, so the economics of drilling require that any available cesium and/or potassium formate be reclaimed and recycled. There are, however, limitations on reclamation processes, in terms of both maximum percentages of cesium and/or potassium formate reclaimed and economical feasibility.

Reclamation processes typical of drilling and completion fluids include removal of dissolved contaminants and any solid cuttings or debris or changes to pH or the coloration of the brine. Typically in the reclamation process, prior to filtration, chemical treatments are made in order to precipitate dissolved ions and reduce the viscosity by breaking polymers present in the fluid. However, further complicating the use of formate brines is that one of the more conventional reclamation techniques, the use of oxidizers for breaking polymers, are typically incompatible with formate brines because the oxidizer tends to oxidize the formate ions, not the polymers.

Accordingly, there exists a continuing need for developments in reclamation processes for contaminated formate brines.

SUMMARY OF INVENTION

In one aspect, embodiments disclosed herein relate to a method of reclaiming a formate brine that includes increasing the pH of a spent formate brine fluid comprising water-soluble polymers; treating the fluid with an oxidizing agent; and removing at least a portion of suspended solids from the fluid.

In another aspect, embodiments disclosed herein relate to a method of reclaiming a formate brine that includes lowering the pH of the spent formate brine fluid comprising water-soluble polymers; increasing the pH of a spent formate brine fluid to initiate precipitation of materials solubilized in the fluid; treating the fluid with an oxidizing agent to break down remaining water-soluble polymer; and recovering at least a portion of the formate brine.

Other aspects and advantages of the invention will be apparent from the following description and the appended claims.

DETAILED DESCRIPTION

In one aspect, embodiments disclosed herein relate to spent wellbore fluids. More particularly, embodiments of the present disclosure relate methods to recover brine from a spent drilling fluid or other well servicing fluid.

For purposes of the present disclosure, brine is a term understood by those skilled in the art of drilling and oil recovery to refer to a salt solution of a particular density used as part of a wellbore fluid. Examples of typical brines include, but are not limited to, formates, acetates, chlorides, bromides, iodides, tungstates, carbonates, bicarbonates, or nitrate salts of ammonium, sodium, potassium, cesium, rubidium, lithium, calcium, magnesium, zinc, or barium, combinations and blends thereof. In a particular embodiment, the brines recovered from the wellbore fluids of the present disclosure, include, but are not limited to, cesium formate, potassium formate, and the like, as well as alkali metal acetates.

Generally, when a wellbore fluid is used and recovered, the fluid will contain the brine as well as water-soluble polymers and other additives, and also solids and other debris that were brought up from the wellbore operation. Polymers are typically added to wellbore fluids in order to provide certain desired properties, such as increased viscosity, during drilling and completing a well. Some typical brine-based well fluid viscosifying additives include natural polymers and derivatives thereof such as hydroxyethyl cellulose (HEC), derivatized HEC, guars, derivatized guars, starches, derivatized starches, scle roglucans, wellan gums, locust bean gum, karaya gum, gum tragacanth, carrageenans, alginates, gum arabic, and biopolymers, such as, for example that derived from fermentation with *xanthomonas campestris*, and other similar polymers, as well as synthetic polymers and oligomer additives such as poly(ethylene glycol) (PEG), poly(diallyl amine), poly(acrylamide), poly(aminomethylpropylsulfonate [AMPS]), poly(acrylonitrile), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinylpyrrolidone), poly(vinyl lactam), and co-, ter-, and quater-polymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, and vinyl lactam.

Examples of the type of other materials frequently present in wellbore fluids include lignite, cauctised lignite, glycols, esters and other oils, calcium carbonate, barite, ilmenite, manganese tetroxide, haemetite (weighting agents), bentonite, sepiolite (clays), emulsifiers, surfactants, lime, hydroxides, lubricants, sulphide scavengers, lost circulation material, and the like. In addition, the fluid that is recovered, as indicated above, can contain solids and other debris such as cuttings, sand, clays, starch, shale, and other solids recovered from the formation.

Thus, following return of the wellbore fluid to the surface, brine contained therein may be reclaimed for future use, for example, in formulation of other wellbore fluids; however, it (the brine) must be separated from the various additives. When the brine has been viscosified with polymers, as described above, breaking of the polymers and separation of the polymer components from the brine must be performed. However, as described above with respect to formate brines, the typical use of oxidizers for breaking polymers are typically incompatible with formate brines because the oxidizer tends to oxidize the formate ions, not the polymers.

The methods of the present disclosure, however, use a multi-step reclamation, whereby polymers (and other materials) are initially precipitated out of solution in a flocculation shock, which is followed by an oxidative treatment to break remaining polymer. The inventors of the present application have advantageously determined that by first "shocking" the polymers with a rapid increase in pH, a follow-up oxidizing treatment will further the breakdown of the polymer, rather than oxidize the formate ions, as otherwise expected. Not being bound by any particular mechanism, it is thought during the flocculation shock, the polymer is broken apart into smaller pieces, which renders the polymer particles more accessible to the oxidizer, and thus more preferentially oxidized.

Typically wellbore fluids that are reclaimed in accordance with the present disclosure possess a pH ranging from 8 to 10.5. When the pH of the wellbore fluid is raised to a pH of greater than 10, and ranging from about 11 to 14 in another embodiment, polymers (and other dissolved solids) may be salted out or precipitated out of solution. Such phenomenon may be best achieved when the pH is raised immediately with the addition of caustics. Further, depending on the brine make-up, it may also be desirable (prior to the increase in pH) to first decrease the pH to a pH ranging from about 4 to 7, and 4 to 6 in another embodiment. Such decrease in pH may increase the solubilization of slightly soluble compounds (i.e., compounds having a solubility of less than 25 g/100 mL) present in the fluid, which may in turn increase the amount of precipitation that occurs during the subsequent increase in pH. Such slightly soluble compounds may include compounds comprising calcium and magnesium, such as, for example, carbonates, sulfates, oxides, and hydroxides of calcium and magnesium. Further, one of ordinary skill in the art would appreciate that such compounds may be present in a wellbore fluid, as mineral species such as chalk, dolomite, gypsum, and lime, etc., or may also be added to a fluid during reclamation. The presence of such slightly soluble material during the pH increase may provide for enmeshment of materials (such as typically observed in flocculation) or the materials may serve as nuclei for precipitates during the subsequent increase in pH.

The pH decrease and increase may be achieved by the addition of any acid or base known in the art. Illustrative examples of such acids include mineral acids, such as hydrochloric acid, hydrobromic acid, nitric acid, sulfuric acid, phosphoric acid and mixtures of these, organic acids such as carboxylic acids such as formic and acetic acid, and such bases include, for example, alkali metal hydroxides, such as sodium hydroxide, potassium hydroxide, cesium hydroxide, and calcium hydroxide. In a particular embodiment, and depending on the type of brine being reclaimed, it may be desirable to use conjugated acid/base of the formate salt of the brine to avoid dilution of the brine occurs.

An oxidizing agent may then be added to the fluid to further increase the degradation of polymer, and enable increased reclamation of the brine. The oxidizing agents that may be used in the reclamation processes of the present disclosure may include peroxides such as, for example, hydrogen peroxide and calcium peroxide, oxyanions of chlorine, bromine, and iodine such as, for example, hypochlorites, chorates, perchlorates, bromates, iodates, and triiodide ions. In particular embodiment, hydrogen peroxide is used as the oxidizing agent. However, one of ordinary skill in the art would appreciate that other types of oxidizing agents may be used to oxidize the polymers of the present disclosure. One of ordinary skill in the art would appreciate that depending on the type of oxidizing agent, the time required to allow for sufficient oxidation of the polymer may vary. Further, one of ordinary skill in the art would appreciate that depending on the particular type of oxidizing agent and the corresponding stoichiometry, the amount of the oxidizing agent may also vary.

Following chemical treatment and precipitation of materials within the fluid, the fluid/solid mixture may be subjected to mechanical separation means to separation the fluid and solids from each other. Such separation means may include those typical in the art, e.g., gravity settling, centrifuge, filters, rotary vacuum filters, skimmers, etc. In a particular embodiment, the fluid/solid mixture is subjected to a centrifuge, after which the centrate from the centrifuge may contain fairly light solids. Depending on the particular fluid, it may also be desirable to use multiple separation techniques, such as centrifuging to remove large particles followed by a filter press to remove small particles. Further, should additional purification of the reclaimed formate brine be desirable, other reclamation techniques, such as that described in U.S. Patent Application No. 60/953,631 entitled "Reclamation of Halide-Contaminated Formate Brines" filed Aug. 2, 2007, which is assigned to the present assigned and herein incorporated by reference in its entirety, or other techniques known in the art may be used.

EXAMPLES

Example 1

A contaminated formate-based (~95 vol % brine content, brine density of 10.3 ppg) mud found to contain 77.45 vol % water, 1.75 vol % oil, 21.0 vol % solids was subjected to various reclamation treatments as shown in Table 1 below.

TABLE 1

| Sample | Treatment | % of reclamation | Brine Density (lb/gal) |
|---|---|---|---|
| 1 | No treatment, centrifuge | 0.0 | — |
| 2 | Start with 30 mL mud; lower pH to 4.3 by 3 mL 88% formic acid; raise pH to 12.35 by 6 mL 50 wt % KOH; stir 5 min then centrifuge | 51.9 | 10.43 |
| 3 | Start with 30 mL mud; lower pH to 4.3 by 3 mL 88% formic acid; raise pH to 12.35 by 6 mL 50 wt % KOH; add 2 mL concentrate $H_2O_2$; stir 5 min then centrifuge | 62.1 | 10.40 |
| 4 | Start with 30 mL mud; add 2 mL concentrate $H_2O_2$; stir 5 min; static at room temp for 22 days | 14.3 | 10.52 |
| 5 | Start with 50 mL mud; add dry KOH pellet to pH 13.8; add 2 mL concentrate $H_2O_2$; stir 5 min; static at room temp for 10 days | 20.0 | — |

Example 2

The effect of hydrogen peroxide loading on reclamation of the contaminated formate-based described in Example 1 was tested. The reclamation treatment involved starting with 30 mL of mud, lowering the pH to 4.3 with 3 mL of 88% formic acid, raising the pH to 12.3 with 6 mL of 50 wt % KOH, and adding a variable amount of 50 wt % $H_2O_2$, stirring for 5 minutes, and then centrifuging. The reclamation results are shown below in Table 2. A treatment of 1.0 mL 50 wt % $H_2O_2$ per 30 mL mud (equivalent to 0.033 bbl of 50 wt % $H_2O_2$ per barrel of mud) was determined to be sufficient.

TABLE 2

| Sample | Volume of 50% $H_2O_2$ | % of reclamation |
|---|---|---|
| 5 | 0.1 mL | 52.6 |
| 6 | 0.5 mL | 52.6 |
| 7 | 1.0 mL | 62.0 |
| 8 | 1.5 mL | 62.1 |

Example 3

1000 mL of the contaminated formate-based described in Example 1 was subjected to a reclamation treatment that involved lowering the pH to 4.47 with 60 mL of 88% formic acid, increasing the pH to 12.2 with 100 mL of 50 wt % KOH, and adding 33 mL of 50 wt % $H_2O_2$, stirring for 30 minutes, and then centrifuging at 2000 rpm. 765 mL of brine having a density of 10.4 lb/gal was reclaimed (60.2% reclamation). The reclaimed brine was subjected to a salt analysis, indicating that the brine contains 22.4 wt % potassium formate, 5.6 wt % sodium formate, and 5.6 wt % sodium chloride.

The reclaimed brine was viscosified to build a reservoir drilling fluid. No abnormal phenomena such as bubbling were observed. The rheological properties were obtained using a Fann 35 viscometer and low shear rate viscosity determined using a Brookfield viscometer. The properties were compared to a mud built with fresh brine. The results shown below in Table 3 indicate that polymers yield fine in the reclaimed brine.

TABLE 3

| Component | Quantity |
|---|---|
| Brine (10.4 ppg) | 333.8 ml/bbl |
| FLO-VIS ™ PLUS | 1.25 g/bbl |
| FLO-TROL ® | 6.0 g/bbl |
| SAFE-CARB ® 2 | 5 g/bbl |
| SAFE-CARB ® 10 | 10 g/bbl |
| SAFE-CARB ® 20 | 15 g/bbl |
| Hot Rolled for 22 hrs at 150° F. | |

| Fann | Rheology at 120° F. | Rheology at 70° F. |
|---|---|---|
| 600/300 | 43/28 | 68/45 |
| 200/100 | 25/20 | 36/26 |
| 6/3 | 8/5 | 12/8 |
| PV/YP | 15/13 | 23/22 |

TABLE 3-continued

| LSRV at 0.3 rpm | | |
|---|---|---|
| 1 min | — | 13697 |
| 2 min | — | 15697 |
| 3 min | — | 16096 |

Example 4

A formate reservoir drilling fluid was formulated as shown below in Table 4.

TABLE 4

| Component | Quantity |
|---|---|
| 14.8 ppg Cs/K Formate | 330.5 ml/bbl |
| FLO-VIS ™ PLUS | 1.5 g/bbl |
| FLO-TROL ® | 6.0 g/bbl |
| soda ash | 1 g/bbl |
| SAFE-CARB ® 10 | 1 g/bbl |
| SAFE-CARB ® 20 | 1 g/bbl |
| SAFE-CARB ® 40 | 19 g/bbl |
| SAFE-CARB ® 250 | 4 g/bbl |
| pH | 11.45 |
| Hot Rolled for 22 hrs at 150° F. | |

| Fann | Rheology at 120° F. | Rheology at 70° F. |
|---|---|---|
| 600/300 | 76/44 | 98/65 |
| 200/100 | 30/18 | 48/29 |
| 6/3 | 4/2 | 7/3 |
| PV/YP | 32/12 | 33/32 |
| LSRV at 0.3 rpm | | |
| 1 min | — | 399.9 |
| 2 min | — | 3299 |
| 3 min | — | 5499 |

The formulated mud was subjected to various reclamation treatments as shown in Table 5 below.

TABLE 5

| Sample | Treatment | % of reclamation |
|---|---|---|
| 9 | No treatment, centrifuge | <50% |
| 10 | Start with 40 mL mud; add 12 mL 50 wt % KOH; stir 5 min; static age at room temp for 3 days; centrifuge | 68% |
| 11 | Start with 40 mL mud; add 1.4 mL 50 wt % $H_2O_2$; stir 5 min; static at room temp for 3 days then centrifuge | 78% |
| 12 | Start with 40 mL mud; lower pH to 5.85 by 6 mL 88% formic acid; raise pH to 10.0 by 12 mL 50 wt % KOH; stir 5 min; static age at room temp for 3 days then centrifuge | 70% |
| 13 | Start with 40 mL mud; lower pH to 5.85 by 6 mL 88% formic acid; raise pH to 10.0 by 12 mL 50 wt % KOH; add 1.4 mL 50 wt % $H_2O_2$; stir 5 min static age at room temp for 3 days then centrifuge | 80% |

A salt analysis of the initial 14.8 ppg K/Cs Brine and the brines reclaimed from samples 11 and 13 was performed. The results are shown in Table 6 below.

TABLE 6

| | 14.8 ppg K/Cs Formate | Sample 11 | Sample 13 |
|---|---|---|---|
| $Ca^{+2}$ | <0.01% | <0.01% | 0.20% |
| $Mg^{+2}$ | <0.01% | <0.01% | <0.01% |
| $Zn^{+2}$ | <0.01% | <0.01% | <0.01% |
| $Na^+$ | 0.32% | 1.47% | 1.18% |
| $K^+$ | 21.7% | 20.8% | 20.5% |
| $Cs^+$ | 30.6% | 29.6% | 24.3% |
| $HCOO^-$ | 32.5% | 32.6% | 32.1% |
| Density (ppg) | 14.76 | 14.57 | 13.35 |

Advantageously, embodiments of the present disclosure for at least one of the following. By preferentially removing polymer and solid particles from a contaminated formate brine, such as a costly cesium or potassium brine, the brine may be reclaimed for future use in wellbore applications and reducing costs associated with formate brines (particular cesium formate). Embodiments of the present disclosure provide a means for improving reclamation of costly formate brines, providing additional cost efficiency in drilling operations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of reclaiming a formate brine, comprising:
   initially increasing the pH of a spent formate brine fluid comprising water-soluble polymers to a pH ranging from about 11 to 14;
   then treating the spent formate brine fluid with an oxidizing agent to oxidize the water-soluble polymers; and
   removing at least a portion of suspended solids from the spent formate brine fluid to generate a reclaimed formate brine fluid.

2. The method of claim 1, further comprising:
   lowering the pH of the spent formate brine fluid prior to increasing the pH.

3. The method of claim 1, wherein the removing comprises centrifuging the spent formate brine fluid.

4. The method of claim 1, wherein the removing comprises filtering suspended solids from the spent formate brine fluid.

5. The method of claim 2, wherein the pH is lowered to a pH ranging from about 4 to 6.

6. The method of claim 2, wherein the lowering the pH dissolves carbonates, sulfates, hydroxides, and oxides of calcium or magnesium present in the spent formate brine fluid.

7. The method of claim 1, wherein the oxidizing agent comprises at least one of a peroxide, triiodide ion, and an oxyanion of chlorine, bromine, and iodine.

8. The method of claim 7, wherein the oxidizing agent comprises at least one peroxide.

9. The method of claim 1, wherein the pH is raised immediately.

10. The method of claim 2, wherein the pH is lowered incrementally.

11. The method of claim 1, further comprising:
    increasing solubilization of a slightly soluble compound.

12. The method of claim 11, wherein the increasing solubilization comprises adding an additional amount of the slightly soluble compound.

13. The method of claim 11, wherein the increasing solubilization comprises decreasing the pH of the spent formate brine fluid.

14. The method of claim 1, further comprising collecting the spent formate brine fluid from a wellbore.

15. A method of reclaiming a formate brine, comprising:
    initially lowering the pH of a spent formate brine fluid comprising water-soluble polymers;
    then increasing the pH of the spent formate brine fluid to a pH ranging from about 11 to 14 to initiate precipitation of materials solubilized in the spent formate brine fluid;
    after increasing the pH, treating the spent formate brine fluid with an oxidizing agent to oxidize and break down remaining water-soluble polymers; and
    recovering at least a portion of the formate brine.

16. The method of claim 15, wherein the pH is lowered to a pH ranging from about 4 to 6.

17. The method of claim 15, wherein the lowering the pH dissolves calcium carbonate present in the spent formate brine fluid.

18. The method of claim 15, wherein the oxidizing agent comprises at least one of a peroxide, triiodide ion, and an oxyanion of chlorine, bromine, and iodine.

19. The method of claim 18, wherein the oxidizing agent comprises at least one peroxide.

20. The method of claim 15, wherein the recovered formate brine comprises at least one of a filtrate or centrate from filtration or centrifugation.

21. The method of claim 15, further comprising collecting the spent formate brine fluid from a wellbore.

\* \* \* \* \*